M. BENSINGER & B. F. GOODRICH.
Cushion for Billiard Tables.

No. 226,827.                    Patented April 27, 1880.

Witnesses:

Inventor:
Moses Bensinger
Benjamin F Goodrich
G. West Bond
attys

UNITED STATES PATENT OFFICE.

MOSES BENSINGER, OF CHICAGO, ILLINOIS, AND BENJAMIN F. GOODRICH, OF AKRON, OHIO, ASSIGNORS TO J. M. BRUNSWICK AND BALKE COMPANY, OF CHICAGO, ILLINOIS.

CUSHION FOR BILLIARD-TABLES.

SPECIFICATION forming part of Letters Patent No. 226,827, dated April 27, 1880.

Application filed January 2, 1878.

*To all whom it may concern:*

Be it known that we, MOSES BENSINGER, of the city of Chicago, Cook county, State of Illinois, and BENJAMIN F. GOODRICH, of Akron, Summit county, State of Ohio, have invented a new and useful Improvement in Cushions for Billiard-Tables, of which the following is a full description, reference being had to the accompanying drawings, in which—

Figure 1:
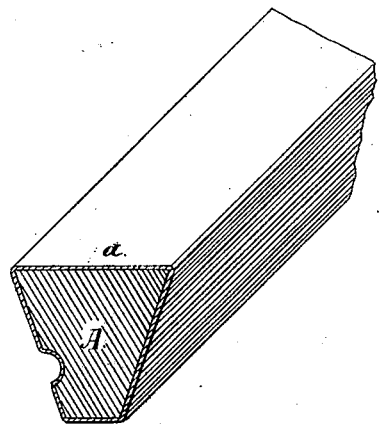
Figure 2:
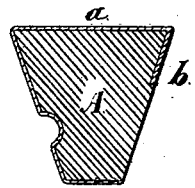

Figure 1 is a cross-section, showing the rubber wholly in case; Fig. 2, a modification.

Billiard-table cushions are usually made from vulcanized rubber, which is secured to the table by means of glue. When india-rubber only is used the ball, in striking, is liable to embed itself too much in the cushion, and the effect of the elastic cushion is confined to quite a limited space. To overcome this difficulty it is customary to provide a facing for the india-rubber. This construction does not sufficiently confine the rubber to accomplish the desired result.

It is also customary to glue the cushion to the wood of the table, and the glue does not adhere readily to india-rubber, and after considerable use the cushion is liable to become detached in places from the wood, which injures its efficiency.

The objects of our invention are to overcome these objections; and it consists in incasing either the whole or a sufficient portion of the rubber with canvas or any other close-woven fabric, which we accomplish by coating one side of the cloth with rubber by means of friction calendering-rollers, and then applying such coated cloth to the rubber for the cushion, after which the whole is vulcanized, as usual, whereby the cloth becomes partly or fully embedded in the cushion and incorporated as a part of it, and by means of which the cushion is more securely attached to the frame.

In the drawings, A represents the rubber cushion. *a* represents a piece of canvas or other suitable material, which, as shown in Fig. 1, completely incases the rubber on all sides. This casing confines the rubber so that when the cushion is struck by a ball its elasticity acts upon the ball from points at a greater distance therefrom than when the cushion is made in the usual way.

The action of this cushion is quicker, and the ball will rebound farther and is not as liable to jump from the table as heretofore. The casing also has a tendency to prevent dampness from affecting the rubber, and renders the action of the cushion more noiseless.

Furthermore, this cushion can be glued much more securely to the table than heretofore, because the glue penetrates and adheres more perfectly to the cloth casing than it does to rubber, and it is less liable to be affected by atmospheric changes or blows against it.

The desired results can be, to a great extent, secured by incasing the rubber with canvas at the bottom, back, and top, overlapping the front, as represented in Fig. 2, in which the lower portion of the face of the cushion is not incased by the canvas; but we deem it important that the back of the cushion should be incased so far as it is to be held to the frame by glue, and also that either the face or the top should be incased.

The casing is flexible, but practically inelastic, and any close-woven fibrous fabric may be used.

The facings which have been used upon india-rubber cushions have not had the effect of confining the rubber so as to utilize the elasticity thereof to the best advantage. This is accomplished by our cushion.

It is common to tack cloth over the cushion to aid in holding it in place. This we dispense with.

Cushions heretofore have been made with textile fabrics, whalebone, and steel inserted within the bodies thereof for protecting and preserving the contour of the face and stiffening them; but in none of them has there been a cover so far extending around and outside of them as to preserve their form at all points, nor have they been so covered or incased as to utilize such covering material as a means for attaching the cushion to the table.

When the cushion shown is in position in the rail for use the green cloth covering is placed over and against it in the ordinary way.

What we claim as new, and desire to secure by Letters Patent, is—

The elastic cushion A, having a partly or fully embedded or exteriorly incorporated casing of canvas or close-woven fabric extending down on the inner side to a point below where the ball strikes, and also on the back and lower parts, where the cushion comes in contact with the wood for attaching the cushion to the frame, substantially as set forth.

MOSES BENSINGER.
BENJAMIN F. GOODRICH.

Witnesses to the signature of Moses Bensinger:
 O. W. BOND,
 L. L. BOND.

Witnesses to the signature of Benjamin F. Goodrich:
 R. P. MARVIN, Jr.,
 HOWARD EDDY.